United States Patent [19]

Smith et al.

[11] 4,223,111

[45] Sep. 16, 1980

[54] PROCESS FOR PREPARING ARYLARSINE SUBSTITUTED POLYSTYRENE

[75] Inventors: Curtis P. Smith, Cheshire; George H. Temme, North Haven, both of Conn.

[73] Assignee: The Upjohn Company, Kalamazoo, Mich.

[21] Appl. No.: 69,763

[22] Filed: Aug. 27, 1979

[51] Int. Cl.² ............................ C08F 8/22; C08F 8/24; C08F 8/42
[52] U.S. Cl. .................................. 525/356; 525/357; 525/358; 525/359; 525/360; 525/364; 525/388
[58] Field of Search ............... 525/359, 360, 364, 388, 525/356, 357, 358

[56] References Cited

U.S. PATENT DOCUMENTS

| | | | |
|---|---|---|---|
| 3,711,429 | 1/1973 | Ito et al. | 525/360 |
| 4,098,973 | 7/1978 | Smith | 525/360 |
| 4,137,386 | 1/1979 | Smith | 525/359 |
| 4,143,063 | 3/1979 | Alberino et al. | 525/360 |

*Primary Examiner*—William F. Hamrock
*Attorney, Agent, or Firm*—Denis A. Firth; John Kekich

[57] ABSTRACT

A process is described for the preparation of a polymer having a recurring unit of the formula:

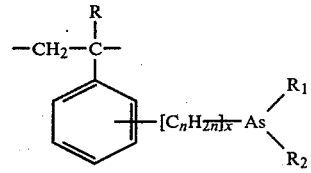

where R is hydrogen or methyl, $C_nH_{2n}$ is lower-alkylene, $R_1$ and $R_2$ are aryl and x is 0 or 1. A polymer having a recurring unit of the formula:

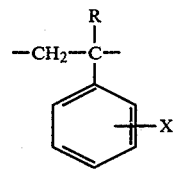

where X is chloro, bromo, iodo, chloroalkyl, bromoalkyl or iodoalkyl, is reacted with a triarylarsine in the presence of lithium or sodium-potassium alloy. The resulting polymer is an intermediate in the preparation, by oxidation, of the corresponding As-oxide. The latter is useful as a catalyst for the conversion of isocyanates to the corresponding carbodiimides.

11 Claims, No Drawings

PROCESS FOR PREPARING ARYLARSINE SUBSTITUTED POLYSTYRENE

BACKGROUND OF THE INVENTION

1. Field of the Invention

This invention relates to the preparation of modified polystyrene polymers and is more particularly concerned with processes for the preparation of organo-arsenic derivatives of polystyrene and related compounds.

2. Description of the Prior Art

Organo-arsenic derivatives of polystyrene and related compounds have recently been shown to be highly active as catalysts for the conversion of organic isocyanates to the corresponding carbodiimides; U.S. Pat. Nos. 4,098,973 and 4,143,063. The preparative procedures for these polymeric catalysts hitherto described have involved reacting the appropriate polystyrene, having a bromo or chloromethyl substituent in at least some of the aromatic nuclei in the polymer chain, with the appropriate dihydrocarbylarsine halide in the presence of metallic lithium. The resulting polymer, having dihydrocarbylarseno substituents in at least some of the aromatic nuclei in the chain, is then oxidized, using hydrogen peroxide or like oxidizing agents, to the corresponding As-oxides which are the polymeric catalysts described in the above cited patents.

The above process has the disadvantage that the dihydrocarbylarsine halides employed as reactants are extremely costly to prepare and this is reflected in the cost of the final polymeric catalysts themselves.

However, in view of the very valuable advantages possessed by the above polymeric catalysts in the preparation of carbodiimides, and particularly in the preparation of carbodiimide-containing diisocyanates, as set forth in U.S. Pat. No. 4,143,063 supra, it was highly desirable to devise more economical methods for the preparation of these polymeric catalysts. We have now found that these polymeric catalysts can be prepared readily by a novel process which involves the use of the relatively inexpensive triarylarsines in place of the highly expensive dihydrocarbylarsine halides.

Laskorin et al., Zh. Obshch. Khim 1978, 48(5), 1088–92 (Chemical Abstracts 89, 110913v, 1978) describes the reaction of chloromethylated divinylbenzene-styrene copolymers with lithium dialkylarsenides to form arsenic-substituted polymers.

SUMMARY OF THE INVENTION

This invention comprises a process for the preparation of a polymer having in its molecule at least one unit of the formula:

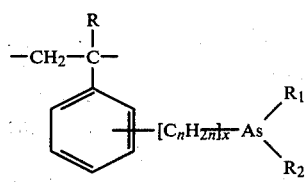

wherein R is selected from the group consisting of hydrogen and methyl, $C_nH_{2n}$ represents lower-alkylene, $R_1$ and $R_2$ independently represent aryl and x is 0 or 1, and the remainder of the recurring units in the polymer have the formula:

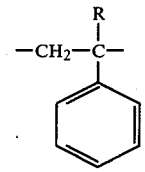

wherein R is as above defined;
which process comprises reacting a mixture of
(a) the corresponding polymer having in its molecule at least one unit represented by the formula:

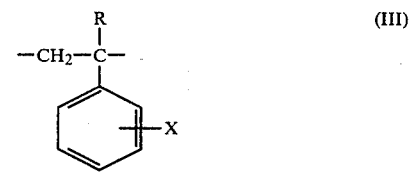

wherein R has the meaning above defined and X is selected from the group consisting of chlorine, bromine, iodine, lower-chloroalkyl, lower-bromoalkyl and iodoalkyl, the remainder of the recurring units in said polymer having the formula (II) above;

(b) at least 1 molar proportion, per unit of formula (III) in said starting polymer, of a triarylarsine of the formula

wherein $R_1$, $R_2$ and $R_3$ each independently represents aryl; and (c) at least 2 gram atoms, per mole of the triarylarsine, of a metal selected from lithium and sodium-potassium alloy.

The process of the invention also comprises the additional step of oxidizing the polymer obtained in the above process to the corresponding As-oxide.

The term "lower-alkylene" means alkylene having from 1 to 6 carbon atoms, inclusive, such as methylene, ethylene, propylene, butylene, pentylene and hexylene including isomeric forms thereof. The term "aryl" means the radical obtained by removing one hydrogen atom from a nuclear carbon of an aromatic hydrocarbon containing from 6 to 12 carbon atoms, inclusvie, and is inclusive of phenyl, tolyl, xylyl, p-butylphenyl, diphenylyl, naphthyl and the like. The term "lower-alkyl" means alkyl from 1 to 6 carbon atoms, inclusive, such as methyl, ethyl, propyl, butyl, pentyl, hexyl and isomeric forms thereof. The terms "lower-chloroalkyl", "lower-bromoalkyl" and "lower-iodoalkyl" mean lower-alkyl as above defined containing a chloro, bromo, or iodo substituent respectively.

DETAILED DESCRIPTION OF THE INVENTION

The polymer which is used as starting material in the process of the invention is a polystyrene in which at least one of the recurring units has been substituted in the benzene ring by chloro, bromo, iodo, lower-chloroalkyl, lower-bromoalkyl or iodoalkyl, said unit having the formula (III) above. If desired, as few as one, or as many as all, of the recurring units in the starting polymer can contain the substituent shown as X in formula (III) above. The actual number of such units so substituted in any given instance depends merely on the number of arsenic-containing units of formula (I) which it is desired to introduce into the polymer. Thus, the substituent X can be introduced into any required number of the aromatic nuclei of a polystyrene by employing the appropriate proportion of halogenating or haloalkylating reagent in accordance with procedures known in the art for such halogenation or haloalkylation; see Relles et al. J. A. C. S. 96, 6469, 1974.

Any of the commonly available forms of polystyrene can be employed in preparing the polymers having a proportion of recurring units of formula (III). The commonly available polystyrenes include the homopolymer of styrene itself, the copolymer of styrene and a minor amount of divinylbenzene (generally 2 percent by weight but higher or lower amounts can be employed if desired), the homopolymers of vinyltoluene, α-methylstyrene, and chlorostyrene as well as the copolymers formed from two or more of the aforementioned monomers. For a detailed description of these various forms of polystyrene and methods for their preparation see, for example, Encyclopedia of Polymer Science and Technology, Vol. 13, p. 128 et seq.; John Wiley and Sons, New York, 1970.

In carrying out the process of the invention the various reactants can be brought together, in any order, in the presence of an inert organic solvent. By the latter is meant a solvent which does not enter into the reaction with any of the reactants or interfere in any way with the desired course of the reaction. Illustrative of such solvents are polar solvents such as tetrahydrofuran, dioxane, dimethoxyethane, diglyme (diethyleneglycol dimethyl ether), tetramethylenesulfone, and the like.

Depending upon the nature of the halo- or haloalkyl-substituted polystyrene employed as starting material and upon the solvents employed, the polystyrene will either be present in solution or as an insoluble phase in suspension. Thus, where the polystyrene is one which has not been cross-linked by copolymerization with, for example, divinylbenzene, it is soluble in polar solvents and the process of the invention can be carried out with the starting polymer in solution. On the other hand, where the halo- or haloalkyl-substituted polystyrene employed as starting material is not soluble to any substantial degree in polar or other solvents, the substituted polystyrene is generally reacted, in the form of beads, powdered material, or other forms having relatively small particle size, in suspension and with agitation as appropriate.

In an illustrative embodiment of the process of the invention, a solution or suspension of the starting halo- or haloalkyl-substituted polystyrene in an inert organic solvent is admixed, with appropriate agitation, with the trihydrocarbylarsine (IV) at ambient temperatures (circa 20–25° C.). The lithium metal or sodium-potassium alloy is then added, in the form of wire, pellets and the like, to the resulting mixture, advantageously under an atmosphere of an inert gas such as nitrogen. In the case of the use of lithium metal an exothermic reaction generally ensues and the temperature of the reaction mixture can be controlled, if desired, by cooling when necessary and applying appropriate agitation. Advantageously, the temperature of the reaction mixture is within a broad range of about ambient temperature to about 100° C. and preferably in the range of about 25° C. to about 70° C.

In the case where sodium-potassium alloy is used in the condensation the reaction is not generally self-initiating at ambient temperatures and it is generally necessary to heat the reaction mixture up to about 70° C. before initiation begins. Thereafter, the same reaction temperature conditions apply as discussed above in the case of the use of lithium metal.

The progress of the reaction can be followed, and the desired end point can be determined, by routine analytical procedures. Illustratively, aliquots of the reaction mixture can be withdrawn at appropriate intervals and examind by infrared spectroscopy, nuclear magnetic resonance spectroscopy, high pressure liquid chromatography and the like. The desired organoarsenic-substituted polymer, characterized by the presence of the unit of formula (I), is isolated from the reaction product by conventional procedures. Illustratively, in the case where the polymer is insoluble in the organic solvent employed in the reaction it is merely necessary to separate the polymer from the reaction solution by filtration, centrifugation, decantation and the like, and wash the isolated polymer with appropriate solvents. In the case where the final polymer is present in solution in the reaction mixture, it can be precipitated therefrom by the addition of an aliphatic alcohol such as methanol or like solvents in which the polymer is insoluble. The precipitate is then separated and washed as described above.

In an alternative embodiment of the process of the invention the triarylarsine, advantageously in solution in the inert organic solvent, is admixed with the lithium or sodium-potassium alloy and the halo- or haloalkyl-substituted polystyrene is added thereto, in solution or suspension, optionally after a period of time which permits interaction of the triarylarsine and the metal.

The proportion in which the triarylarsine (IV) is employed in the process of the invention is advantageously of the order of about 1 mole to about 3 mole per molar proportion of the unit of formula (III) in the starting polymer. Preferably the triarylarsine is employed in a proportion of about 1.3 moles to about 2 moles per molar proportion of the unit of formula (III) in the starting polymer.

The lithium metal or sodium-potassium alloy is advantageously employed in an amount which represents at least 2 gram atoms per mole of the triarylarsine which is present in the reaction mixture. Preferably the metal is employed in excess of the above amount said excess being of the order of about 25 to about 100 percent over the stoichiometric proportion.

The polymers produced in accordance with the process described above can, as explained previously, contain from only 1 to substantially all of the recurring units in the form shown in formula (I) depending upon the proportion of halo- or haloalkyl-substitution of the starting polymer. The polymers obtained as described above can then be converted, by oxidation using the procedures described in the aforesaid U.S. Pat. No. 4,098,973, to the corresponding As-oxide containing polymers in which the arsenic-containing moieties have the formula:

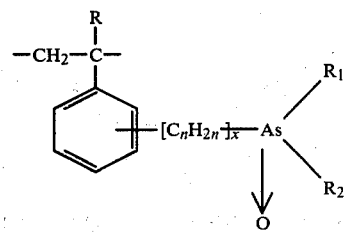

wherein R, R₁, R₂, $C_nH_{2n}$ and x have the meaning hereinbefore defined. The As-oxide polymers are highly active catalysts for the conversion of organic isocyanates partially or wholly to the corresponding carbodiimides as disclosed in the U.S. patents cited supra.

Illustrative of triarylarsines which can be used in the process of the invention are triphenylarsine, p-tolyldiphenylarsine, tri(p-tolyl)arsine, tri(m-xylyl)-arsine, p-butylphenyl-diphenylarsine, tri(α-naphthyl)arsine, tri(diphenylyl)arsine and the like.

The sodium-potassium alloy employed in the process of the invention is prepared in accordance with methods well-known in the art; see, for example, Murrer et al. Synthesis, May, 1979 pp. 350-2.

The following preparation and examples describe the manner and process of making and using the invention and set forth the best mode contemplated by the inventors of carrying out the invention but are not to be construed as limiting.

PREPARATION

The polystyrene employed in this preparation was 2% vinylbenzene cross-linked polystyrene in the form of beads (200–400 mesh; Eastman Kodak) which had been washed successively with mixtures of methylene chloride and methanol in the ratios by volume of 9:1, 3:1, 2:3, and 9:1 and finally with methanol before being dried at 80° C. for 4 hours. The polystyrene beads so treated (50 g.) were suspended in 500 ml. of carbon tetrachloride and 1.17 g. of thallic acetate was added. The glass vessel containing the suspension was enveloped in aluminum foil to exclude light and, after stirring the suspension for 30 minutes at circa 20° C. under an atmosphere of nitrogen, a solution of 6.72 g. (0.042 mol.) of bromine in 20 ml. of carbon tetrachloride was added slowly with stirring. The resulting mixture was stirred at circa 20° C. for 1 hour before being heated to reflux. After an hour at reflux it was found that bromine was still present so a further 0.55 g. of thallic acetate was added and the refluxing was continued for a further 30 minutes. At the end of this time no free bromine could be detected in the reaction mixture and the latter was cooled to circa 20° C. The solid material was separated and washed with 200 ml. each of carbon tetrachloride, methanol and methylene chloride and then with successive mixtures of methylene chloride and methanol in the ratio of 1:0, 2:3, 3:1, 9:1 and 1:0. Finally, the solid was washed successively with 200 ml. each of acetone, acetone and water mixture (2:1) twice, acetone, methanol and methylene chloride. The washed solid was dried at 80° C. overnight and finally at 80° C. under 1 mm. of mercury pressure for 2 hours. Elemental analysis showed the presence of 5.96 percent by weight of bromine corresponding to the presence of bromine in 8.26 percent of phenyl nuclei in the polystyrene.

EXAMPLE 1

An aliquot (13.92 g.: 10.39 milliequivs.) of the brominated polystyrene prepared as described in the above Preparation was suspended in 75 ml. of tetrahydrofuran under an atmosphere of argon. To the suspension was added 0.16 g. (23 mmol.) of lithium wire and 3.18 g. (10.39 mmol.) of triphenylarsine and the resulting mixture was stirred at room temperature (circa 20° C.) for 70 minutes. Towards the end of this time the reaction commenced and the solution turned red. The reaction mixture was heated to reflux and maintained thereat for 2 hours before being cooled to room temperature and kept for 2 days with stirring at this temperature. The excess lithium was removed from the resulting mixture and the solid polymer was isolated and washed successively with 200 ml. each of methanol and methylene chloride, then with mixtures of methanol and methylene chloride in the ratio by volume of 3:2, 1:3, and 1:9, and finally with methylene chloride. There was thus obtained a polystyrene characterized by the presence therein of recurring units having the formula:

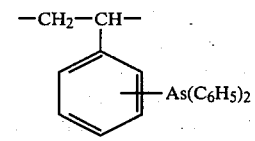

The product so obtained was then suspended in 100 ml. of acetone and 5.6 g. of 30% by weight aqueous hydrogen peroxide was added with stirring. The mixture was stirred for 2.5 hours at room temperature and the solid material was then isolated by filtration and washed with 100 ml. of toluene. The washed material was slurried in 100 ml. of toluene and the mixture was subjected to azeotropic distillation until no further water distilled over. The dried material was isolated by filtration and washed successively with 250 ml. portions of mixtures of methanol and methylene chloride in the ratio by volume of 3:2, 1:3, 1:9 and 0:1. The washed material was dried at 80° C. overnight. There was thus obtained 12.28 g. of a polymer in the form of yellow beads.

Elemental analysis showed the presence of 1.40 percent by weight of arsenic corresponding to the presence of approximately 2 percent of units of the formula:

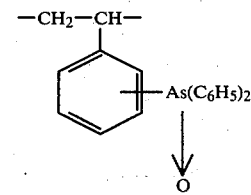

the remainder of the units in said polymer having the formula:

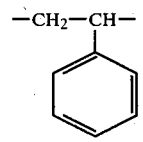

EXAMPLE 2

To a solution of 3.06 g. (10 mmol.) of triphenylarsine in 75 ml. of tetrahydrofuran maintained under an atmosphere of argon was added 4 cm. (165 mg.; 23.8 mmol.) of lithium wire. After being stirred for a few minutes the solution turned reddish brown. The mixture was heated at 70° C. for 5 minutes and then allowed to cool to room temperature (circa 20° C.). The cooled mixture was stirred for 3 hours at the end of which time 15.5 g. (8.22 milliequivs. of bromine) of brominated polystyrene (prepared as described in the above Preparation) was added and the mixture was then stirred at room temperature for 16 hours. The resulting product was then worked up by isolation of the polymer followed by solvent washing as described in Example 1 to yield a polymer characterized by the presence therein of recurring units having the formula:

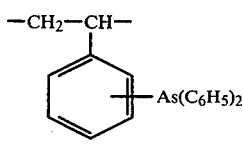

This polymer was then oxidized using the procedure described in Example 1 to obtain 15.37 g. of a polymer in the form of white beads. Elemental analysis showed the presence of 1.59 percent by weight of arsenic corresponding to the presence in the polymer of approximately 3 percent of recurring units of the formula:

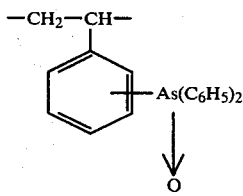

The elemental analysis of the polymer also showed the presence of 1.05 percent by weight of bromine indicating that approximately 1 percent of the remaining phenyl nuclei in the recurring polymer still contained bromine. The balance of the recurring units of the polymer had the formula:

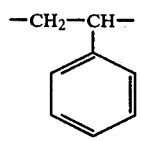

EXAMPLE 3

Using the procedure described in Example 1, but replacing the triphenylarsine there used by an equivalent amount of tri(p-tolyl)arsine, tri(m-xylyl)arsine or tri(α-naphthyl)arsiine there are obtained polymers having the recurring unit of formula (I) wherein x is zero, R is hydrogen and $R_1$ and $R_2$ are each p-tolyl, m-xylyl or α-naphthyl, respectively.

We claim:

1. A process for the preparation of a polymer having in its molecule at least one unit having the formula:

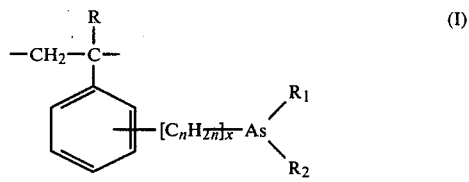

wherein R is selected from the group consisting of hydrogen and methyl, $C_nH_{2n}$ represents lower-alkylene, $R_1$ and $R_2$ each independently represents aryl and x is 0 or 1, and the remainder of the recurring units in the polymer have the formula:

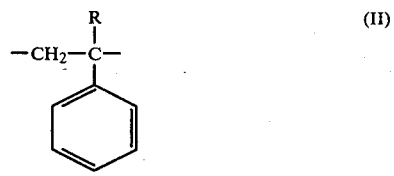

wherein R is as above defined;
which process comprises reacting a mixture of
(a) the corresponding polymer having in its molecule at least one unit represented by the formula:

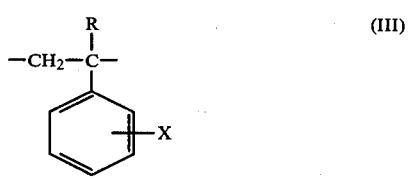

wherein R has the meaning above defind and X is selected from the group consisting of chlorine, bromine, iodine, lower-chloroalkyl, lower-bromoalkyl and lower-iodoalkyl, the remainder of the recurring units in said polymer having the formula (II) above;
(b) at least 1 molar proportion, per unit of formula (III) in said starting polymer, of a triarylarsine of the formula:

wherein $R_1$, $R_2$ and $R_3$ each independently represents aryl; and
(c) at least two gram atoms, per mole of said triarylarsine, of a metal selected from lithium and sodium-potassium alloy.

2. A process according to claim 1 wherein X in the unit (III) in said starting polymer represents bromine.

3. A process according to claim 1 wherein the triarylarsine employed as component (b) is triphenylarsine.

4. A process according to claim 1 wherein the metal employed as component (c) is lithium.

5. A process according to claim 1 wherein the components (a), (b) and (c) are reacted in the presence of an inert organic solvent.

6. A process according to claim 1 wherein said unit of formula (III) in said starting material has the structure:

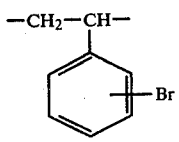

and the reaminder of the units in said starting polymer have the formula:

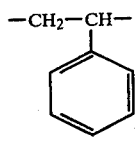

7. A process for the preparation of a polystyrene in which at least one unit has the formula:

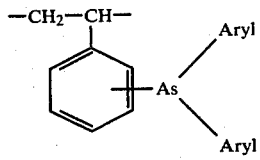

which process comprises reacting a mixture of:
(a) a polystyrene in which at least one benzene nucleus contains a halo-substituent selected from the class consisting of chloro, iodo and bromo;
(b) at least one molar proportion, for each halogenated benzene nucleus in said polystyrene, of a triarylarsine; and
(c) at least 2 gram atoms, per mole of said triarylarsine, of a metal selected from lithium and sodium-potassium alloy.

8. A process according to claim 7 wherein component (b) is triphenylarsine whereby the resulting polystyrene contains at least one unit of the formula:

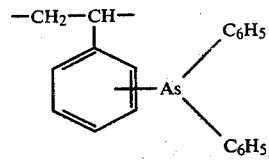

9. A process according to claim 7 wherein the metal employed as component (c) is lithium.

10. A process according to claim 7 wherein the reaction is carried out in the presence of an inert polar organic solvent.

11. A process according to claim 1 which also comprises the step of oxidizing the polymer having the unit of formula (IJ) whereby there is obtained the corresponding polymer in which each unit of formula (I) has been converted to a unit having the formula:

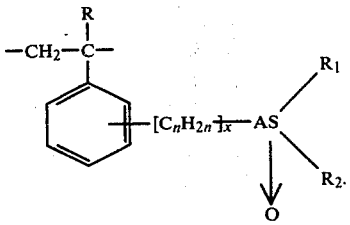

wherein R, $C_nH_{2n}$, x, $R_1$ and $R_2$ have the meaning defined in claim 1.

* * * * *

UNITED STATES PATENT OFFICE
CERTIFICATE OF CORRECTION

Patent No. 4,223,111                Dated September 16, 1980

Inventor(s) Curtis P. Smith and George H. Temme

It is certified that error appears in the above-identified patent and that said Letters Patent are hereby corrected as shown below:

Column 2, lines 34 through 38:

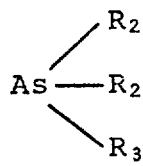   should read   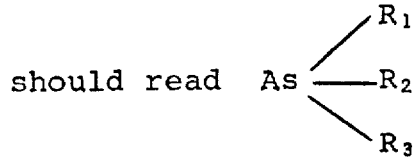

Column 4, line 16 "examind" should read --examined--. Column 7, line 62 "tri(α-naphthyl)arsiine" should read --tri(α-naphthyl)arsine--. Column 9, claim 6, line 12 "reaminder" should read --remainder--. Column 10, claim 11, line 23 "formula (IJ)" should read --formula (I)--.

Signed and Sealed this

Twelfth Day of May 1981

[SEAL]

Attest:

RENE D. TEGTMEYER

Attesting Officer    Acting Commissioner of Patents and Trademar